(12) United States Patent
Chen et al.

(10) Patent No.: US 11,821,183 B2
(45) Date of Patent: Nov. 21, 2023

(54) FAST ASSEMBLING FAUCET COMPONENT FOR DUAL WATER SOURCES

(71) Applicants: Jui-Chien Chen, Lugang Township (TW); Jui-Ching Chen, Lugang Township (TW)

(72) Inventors: Jui-Chien Chen, Lugang Township (TW); Jui-Ching Chen, Lugang Township (TW)

( * ) Notice: Subject to any disclaimer, the term of this patent is extended or adjusted under 35 U.S.C. 154(b) by 194 days.

(21) Appl. No.: 17/515,763

(22) Filed: Nov. 1, 2021

(65) Prior Publication Data
US 2023/0136123 A1     May 4, 2023

(51) Int. Cl.
*E03C 1/04*     (2006.01)
*F16K 11/00*     (2006.01)

(52) U.S. Cl.
CPC .......... *E03C 1/0403* (2013.01); *F16K 19/006* (2013.01)

(58) Field of Classification Search
CPC ................. E03C 1/0401; E03C 1/0403; E03C 2001/0415; F16K 19/006
See application file for complete search history.

(56) References Cited

U.S. PATENT DOCUMENTS

| | | | | |
|---|---|---|---|---|
| 7,299,992 B1* | 11/2007 | Chen | ................. | G05D 23/1353 |
| | | | | 222/146.2 |
| 9,481,985 B1* | 11/2016 | Chen | ..................... | E03C 1/0412 |
| 11,313,111 B1* | 4/2022 | Chen | ..................... | E03C 1/102 |
| 2012/0312401 A1 | 12/2012 | Gloira et al. | | |
| 2019/0055719 A1* | 2/2019 | Chen | ..................... | E03C 1/0404 |

FOREIGN PATENT DOCUMENTS

| | | | | |
|---|---|---|---|---|
| CN | 116065664 | * | 5/2023 | |
| EP | 2472150 | * | 7/2012 | ............ E03C 1/0411 |

* cited by examiner

Primary Examiner — J C Jacyna
(74) Attorney, Agent, or Firm — Egbert, McDaniel & Swartz, PLLC

(57) ABSTRACT

A faucet assembly for rapid assembly of dual water sources includes a main body, a socket, a positioning member and a water pipe, wherein the main body includes a base and an extending pipe. The socket is arranged inside the base, the positioning member restricts the axial displacement of the socket, and the water pipe enters the extending pipe through the socket and the base. The water pipe includes an outer pipe, an inner pipe, and a water inlet structure, wherein the inner pipe is arranged inside the outer pipe, the outer pipe and the inner pipe are respectively connected to the water inlet structure, and the water inlet structure is laterally embedded in the water inlet structure. Water from different water sources enters the outer and inner pipes through the water inlet structure respectively.

11 Claims, 12 Drawing Sheets

FAST ASSEMBLING FAUCET COMPONENT FOR DUAL WATER SOURCES

CROSS-REFERENCE TO RELATED U.S. APPLICATIONS

Not applicable.

BACKGROUND OF THE INVENTION

1. Field of the Invention

The present invention relates generally to a faucet component as kitchenware, and more particularly to a fast assembling faucet component for dual water sources.

2. Description of Related Art Including Information Disclosed Under 37 CFR 1.97 And 37 CFR 1.98

In the kitchen, water from different sources is usually required for different purposes like washing or drinking. In order to reduce the number of faucets installed in the kitchen, and enhance the utilization of the kitchen space, a faucet has been developed for connection to dual water sources.

Said faucet that can be connected to dual water sources includes a main body, two valve cores, a flow guide component, a water pipe and a water outlet, wherein each valve core and the flow guide component is respectively arranged inside the main body, the water outlet is configured on the water outlet end of the main body, and the water outlet is configured with two water outlet structures. Each valve core is respectively communicated to different water sources through a pipe, and each valve core respectively controls the flow of water from each water source into the flow guide component. One end of the water pipe is connected to the flow guide component. The water pipe passes through the inside of the main body and extended to the water outlet. The water pipe includes an outer pipe and an inner pipe. The inner pipe is arranged inside the outer pipe. The outer pipe and the inner pipe are respectively communicated to each water outlet structure. The flow guide component is used to guide the water flow from each valve core to respectively go into the outer pipe and the inner pipe, so that water from each water source can respectively pass through the outer pipe and the inner pipe, and flow out from each water outlet structure. Furthermore, as needed, the water outlet can be disassembled from the main body. In this case, the water outlet pulls the flexible water pipe to move along with the water outlet, so that the water outlet can be put close to the object to be washed or the water container to avoid splash of water and enhance convenience.

The construction of the flow guide component is complicated, and the assembly between the flow guide component and the main body is not easy.

BRIEF SUMMARY OF THE INVENTION

The main object of the present invention is to provide a fast assembling faucet component for dual water sources. It aims to solve the problems existing in the prior art and make an innovative breakthrough in developing a new-style faucet component for dual water sources.

Based on the above object, the problem-solving technical features of the invention of a fast assembling faucet component for dual water sources include:

a main body, the main body includes a base and an extending pipe, wherein the top end of the base is connected to one end of the extending pipe, the other end of the extending pipe is separably connected to a water outlet, the two sides of the base are respectively formed with a first valve chamber and a second valve chamber, so that the first valve is configured in the first valve chamber, a second valve is configured in the second valve chamber, the inside of the base is formed with a first chamber, a second chamber, a third chamber and a connecting channel, the first chamber is extended to the bottom of the base and is communicated to the outside, the second chamber extends upward through the first chamber, the third chamber extends upward through the second chamber, the connecting channel is communicated to the first chamber and the extending pipe, a first flow channel is communicated to the first valve chamber and the second chamber, a second flow channel is communicated to the second valve chamber and the third chamber, so that the first valve can control water to pass through the first flow channel and go into the second chamber, the second valve controls water to pass through the second flow channel and go into the third chamber;

a socket is configured on the first chamber, the socket is formed with a first passageway and a second passageway along the axial direction, the first passageway and the second passageway are respectively extended to the top end and bottom end of the socket, the inner edge of the first passageway is formed with a convex part along the radial direction, the second passageway is communicated to the connecting channel, the socket crosses a first inlet channel and a second inlet channel, so that the water from the first water source can pass through the first inlet channel and go into the first valve chamber, and water from the second water source can pass through the second inlet channel and go into the second valve chamber;

a positioning member is connected to the base, so as to position the socket, and limit the axial displacement of the socket; and a water pipe passes through the second passageway and the connecting channel and goes into the extending pipe to be connected to the water outlet, the water pipe includes an outer pipe, an inner pipe and a water inlet structure, wherein the inner pipe is configured inside the outer pipe, the outer pipe and the inner pipe is respectively communicated to the water inlet structure, the water inlet structure is radially formed with a convex ring extending outward, the water inlet structure is axially configured on the first passageway, the convex part is located below the convex ring, so as to relatively limit the water inlet structure, thus, water from the first water source can pass through the second chamber, the water inlet structure, and go into the outer pipe, and water from the second water source can pass through the third chamber, the water inlet structure, and go into the inner pipe.

The main efficacy and advantage of the present invention is that, through the relative construction of the water inlet structure, the socket and the base, the assembly of the water pipe and the main body can be completed easily and quickly.

DETAILED DESCRIPTION OF THE INVENTION

Figure 1:
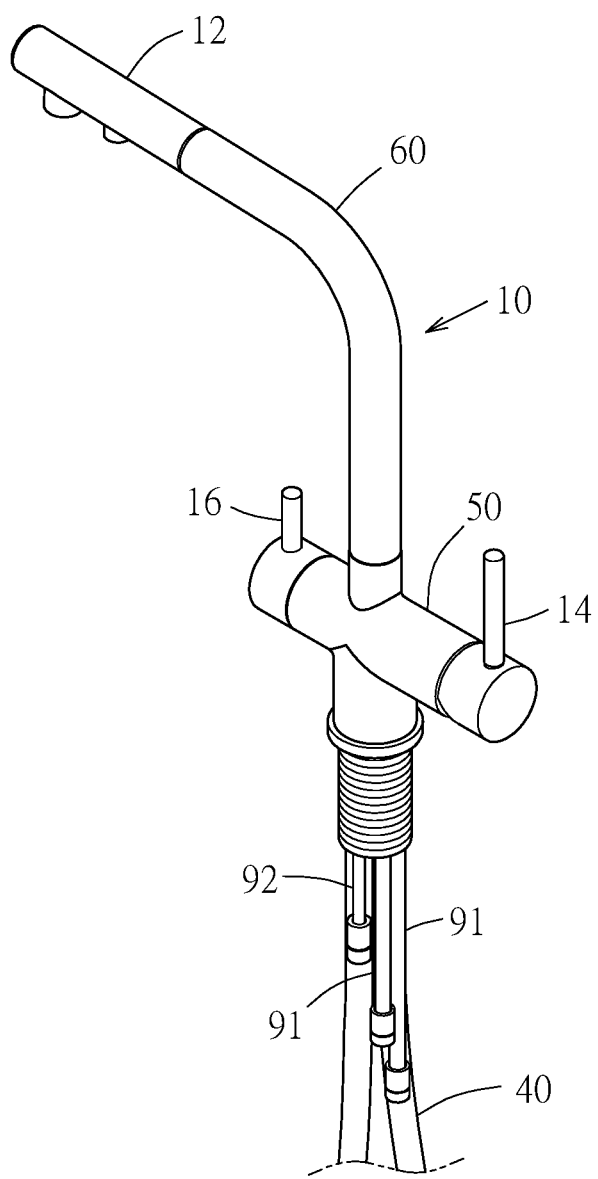
FIG. 1 is a perspective view of a preferred embodiment of the invention.
Figure 2:
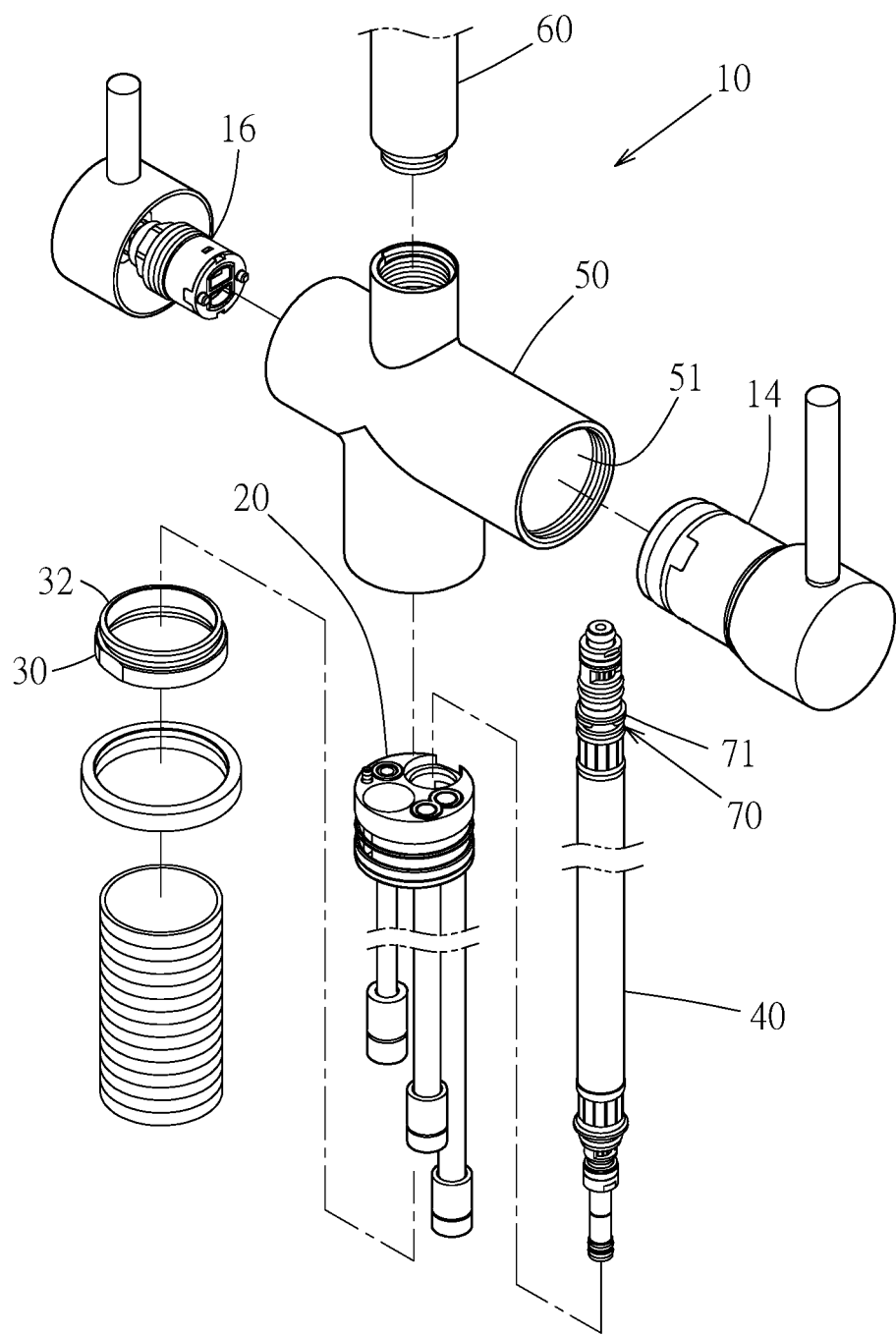
FIG. 2 is an exploded perspective view of a preferred embodiment of the invention.
Figure 3:
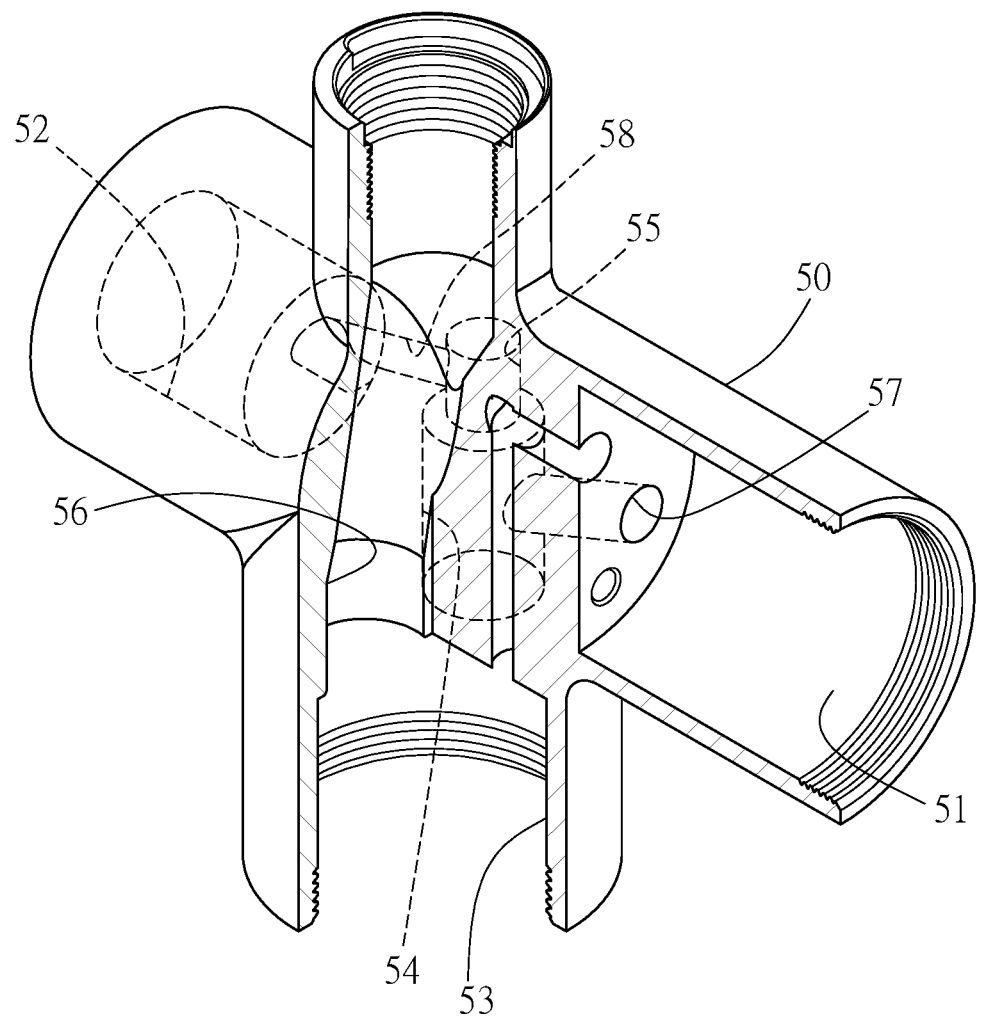
FIG. 3 is a perspective view of the base of a preferred embodiment of the invention.
Figure 4:
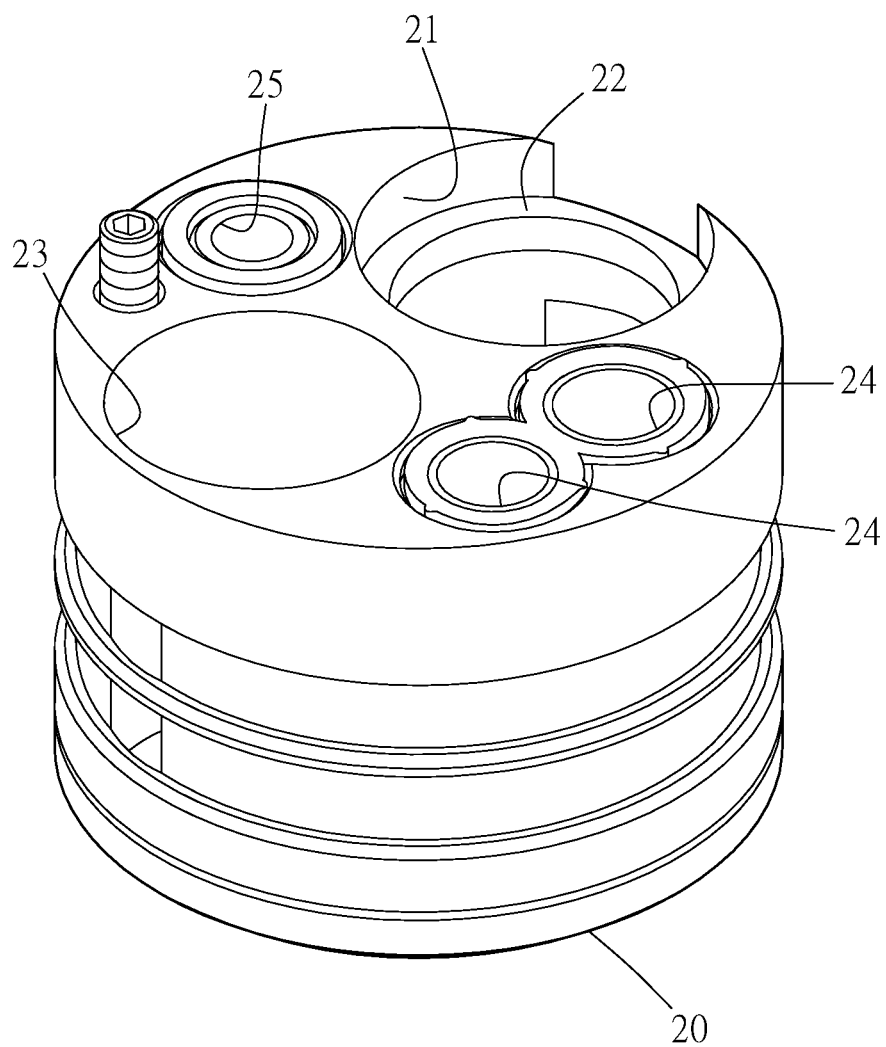
FIG. 4 is a perspective view of the socket of a preferred embodiment of the invention.
Figure 5:
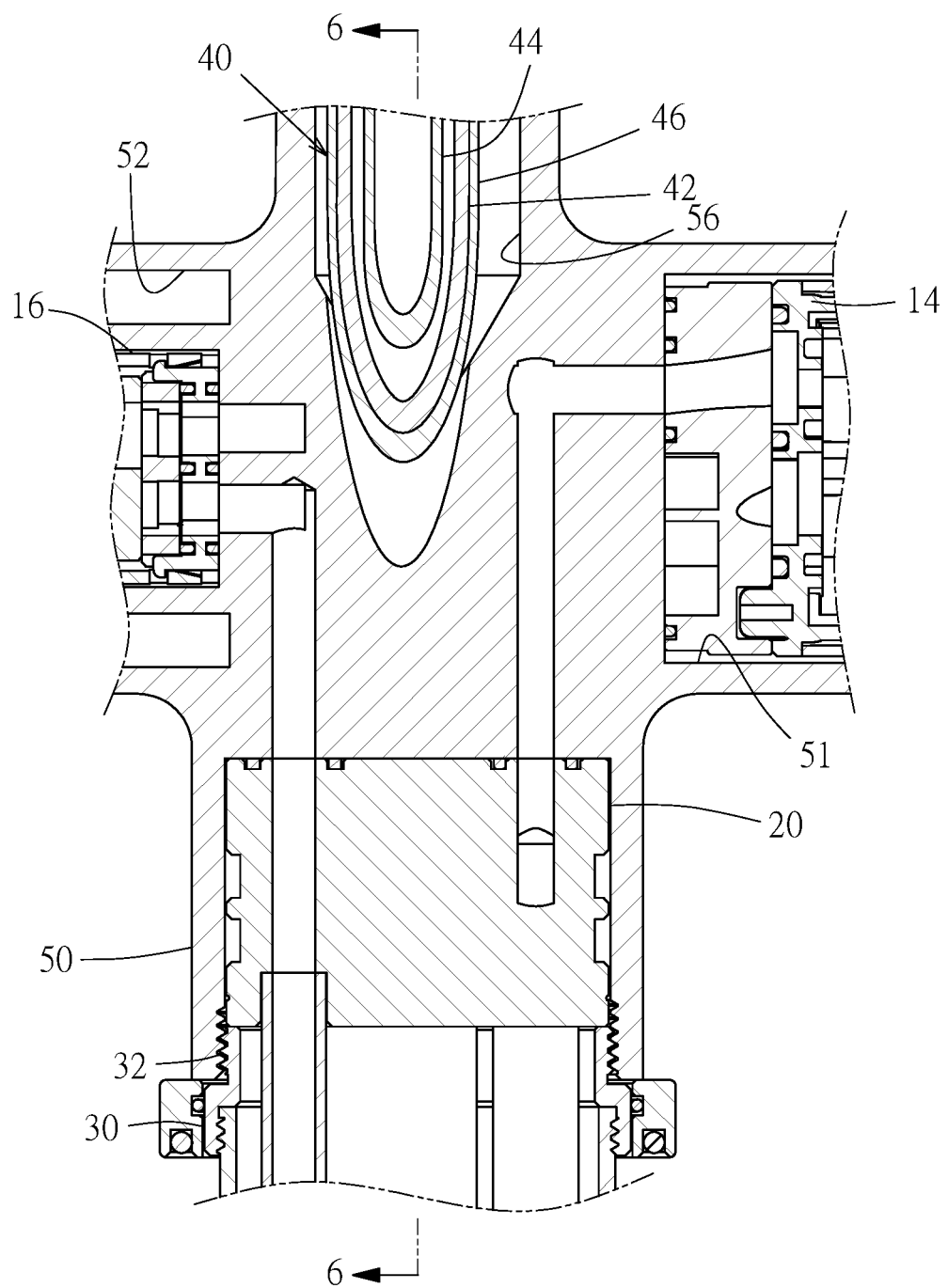
FIG. 5 is a partial sectional view a preferred embodiment of the invention.
Figure 6:
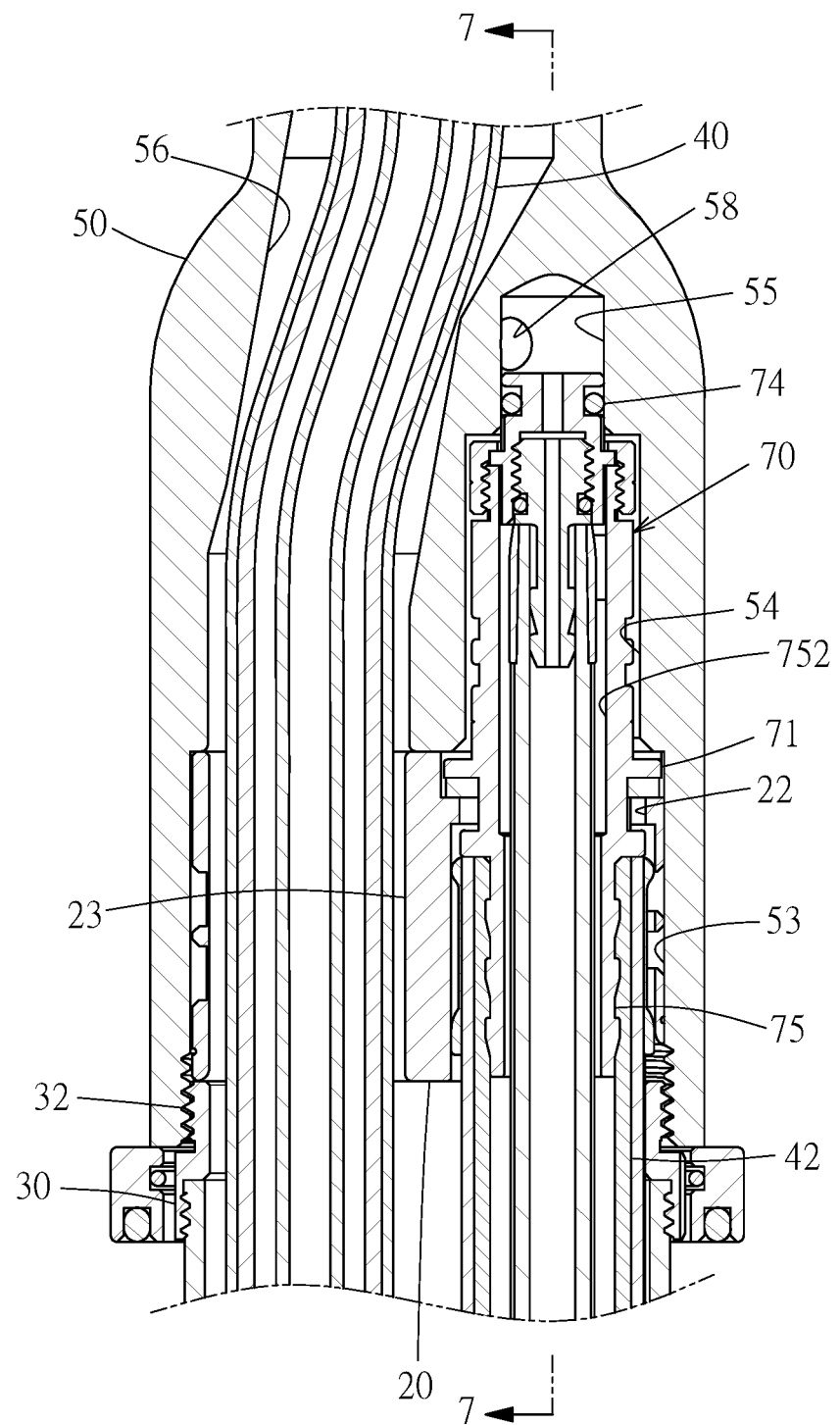
FIG. 6 is 6-6 sectional view of FIG. 5.
Figure 7:
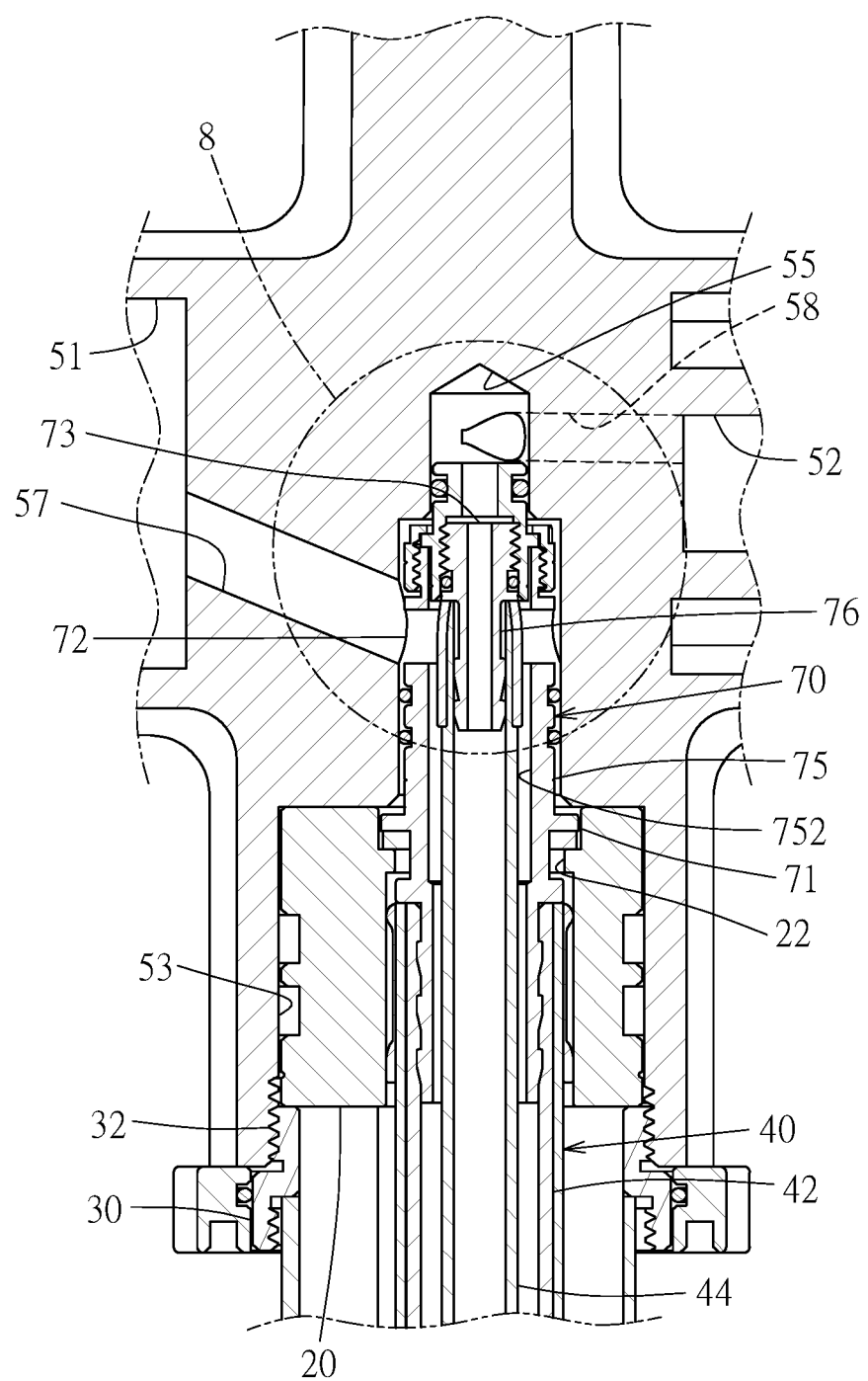
FIG. 7 is 7-7 sectional view of FIG. 6.
Figure 8:
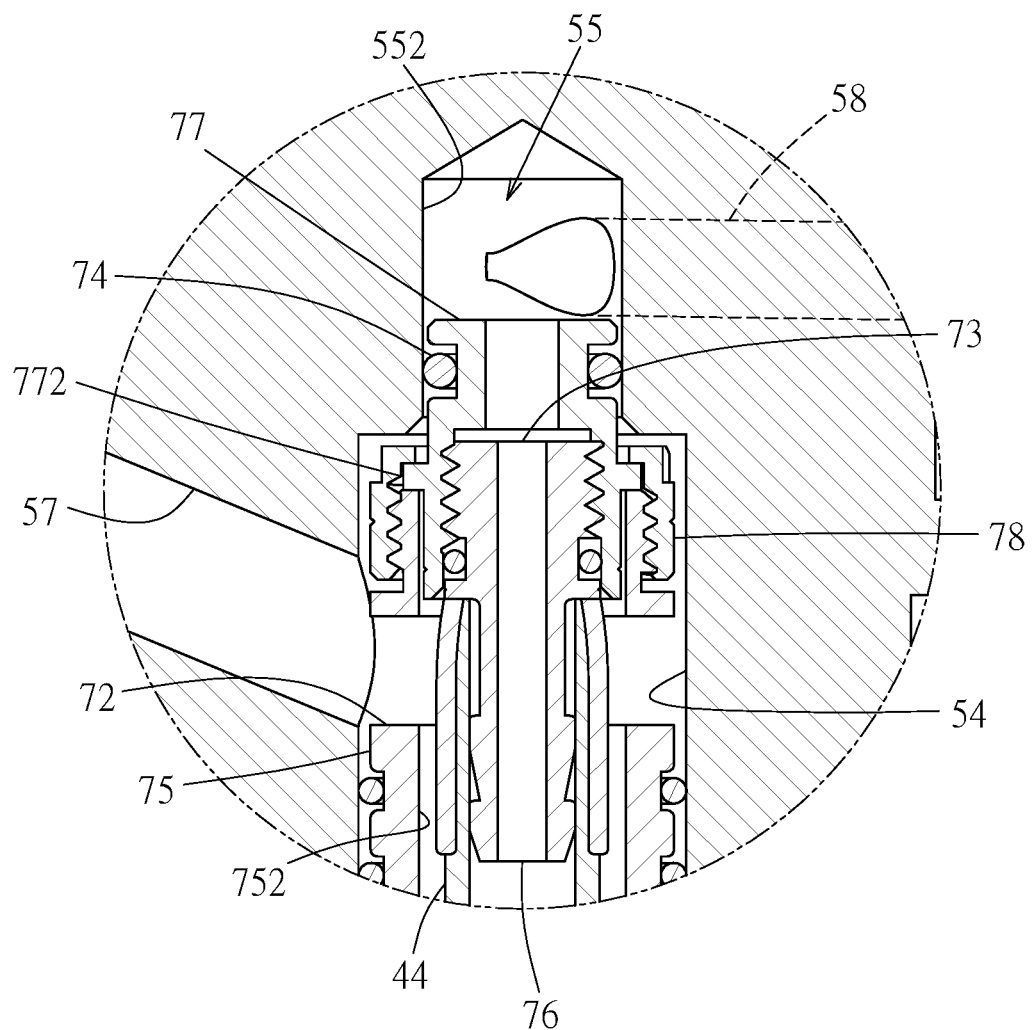
FIG. 8 is a partial enlarged view of FIG. 7.

Depicted in FIG. 1 through FIG. 8 is a preferred embodiment of the fast assembling faucet component for dual water sources according to the invention, which includes a main body 10, a socket 20, a positioning member 30 and a water pipe 40. The main body 10 includes a base 50 and an extending pipe 60, wherein the top end of the base 50 is connected to one end of the extending pipe 60, the other end of the extending pipe 60 is separably connected to a water outlet 12. The two sides of the base 50 are respectively formed with a first valve chamber 51 and a second valve chamber 52, so that the first valve 14 is configured in the first valve chamber 51, the second valve 16 is configured in the second valve chamber 52. The inside of the base 50 is formed with a first chamber 53, a second chamber 54, a third chamber 55 and a connecting channel 56. The first chamber 53 is extended to the bottom of the base 50 and is communicated to the outside. The second chamber 54 extends upward through the first chamber 53. The third chamber 55 extends upward through the second chamber 54. The connecting channel 56 is communicated to the first chamber 53 and the extending pipe 60. The sectional area of the connecting channel 56 in the horizontal direction is smaller than the first chamber 53. A first flow channel 57 is communicated to the first valve chamber 51 and the second chamber 54. A second flow channel 58 is communicated to the second valve chamber 52 and the third chamber 55, so that the first valve 14 can control water to pass through the first flow channel 57 and go into the second chamber 54. The second valve 16 controls water to pass through the second flow channel 58 and go into the third chamber 55.

The socket 20 is configured in the first chamber 53, and the socket 20 is formed with a first passageway 21 and a second passageway 23 along the axial direction. The first passageway 21 and the second passageway 23 are respectively extended to the top end and bottom end of the socket 20. The inner edge of the first passageway 21 is formed with a convex part 22 along the radial direction. The second passageway 23 is communicated to the connecting channel 56. The socket 20 crosses the two first inlet channels 24 and a second inlet channel 25, so that the water from the first water source (not shown in the figure) is transmitted by the two first pipes 91 to pass through each first inlet channel 24 and go into the first valve chamber 51, and the water from the second water source (not shown in the figure) is transmitted by the second pipe 92 to pass through the second inlet channel 25 and go into the second valve chamber 52. Under the control of the first valve 14 and the second valve 16, the water respectively flows to the second chamber 54 and the third chamber 55. In the case that the first valve 14 is a cold and hot water mixing valve, there are respectively two first inlet channels 24 and two first pipes 91. Based on the options and exchanges of the first valve 14 and the second valve 16, the numbers of the first inlet channels 24, the second inlet channels 25, the first pipes 91 and the second pipes 92 can be changed accordingly, and are not limited to the example provided in the preferred embodiment. However, the number of the first inlet channel 24, the second inlet channel 25, the first pipe 91 and the second pipe 92 must be at least one.

As needed, the first passageway 21 can be extended laterally to one side of the socket 20, in the form of a lateral opening, so as to form another embodiment not shown in the drawings. Said another embodiment is a variation based on the preferred embodiment.

The positioning member 30 is connected to the base 50, so as to position the socket 20, and limit the axial displacement of the socket 20.

The water pipe 40 passes through the second passageway 23 and the connecting channel 56 and goes into the extending pipe 60 to be connected to the water outlet 12. The water pipe 40 includes an outer pipe 42, an inner pipe 44 and a water inlet structure 70, wherein the inner pipe 44 is configured inside the outer pipe 42, the outer pipe 42 and the inner pipe 44 is respectively communicated to the water inlet structure 70. The water inlet structure 70 is formed with a convex ring 71 extending outward in the radial direction. The water inlet structure 70 is configured on the first passageway 21 in the axial direction. The convex part 22 is located below the convex ring 71, so as to relatively limit the water inlet structure 70. Thus, water from the first water source passes through the second chamber 54, the water inlet structure 70, and go into the outer pipe 42, water from the second water source passes through the third chamber 55, the water inlet structure 70, and go into the inner pipe 44. The outer pipe 42 is further sheathed with a protecting jacket 46. The protecting jacket 46 is an optional component, used to protect the outer pipe 42, avoiding damage of the outer pipe 42 during the configuration due to abrasion.

Figure 9:
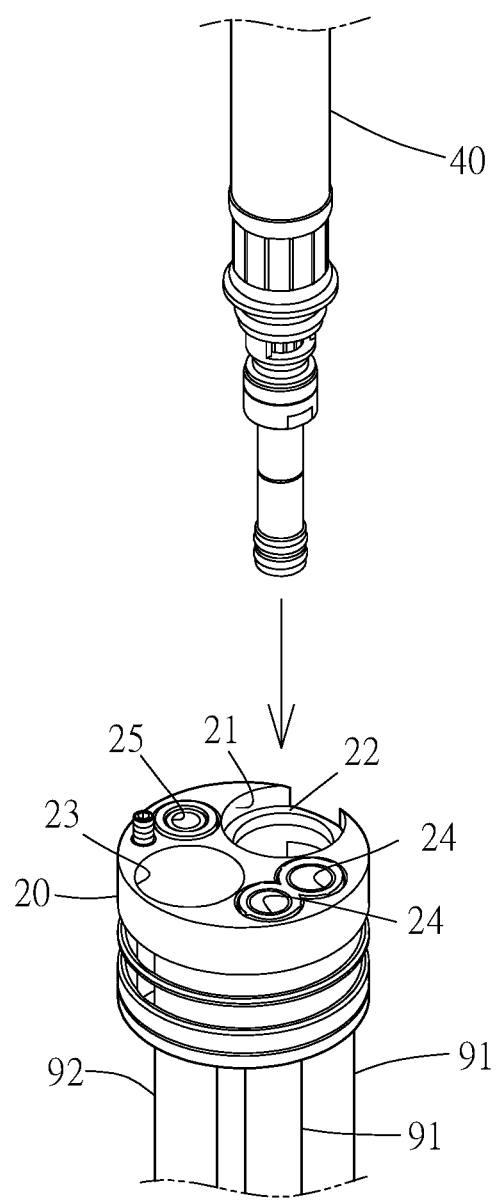
FIG. 9 is a perspective view (I) showing the assembly operation of a preferred embodiment of the invention.
Figure 10:
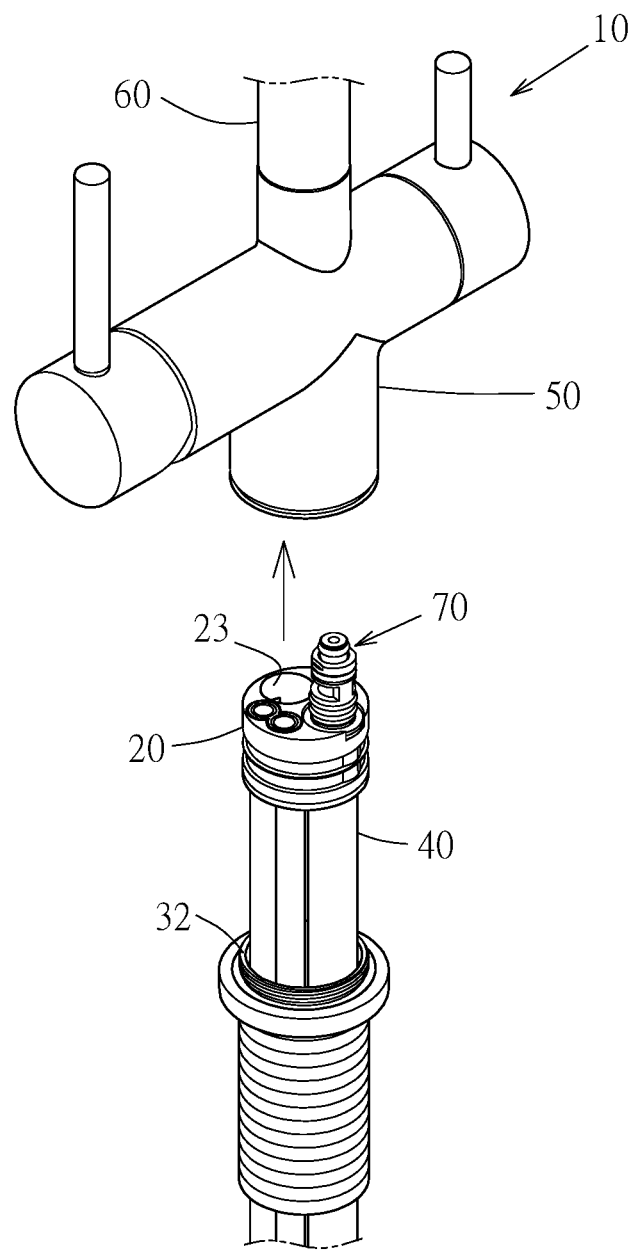
FIG. 10 is a perspective view (II) showing the assembly operation of a preferred embodiment of the invention.
Figure 11:
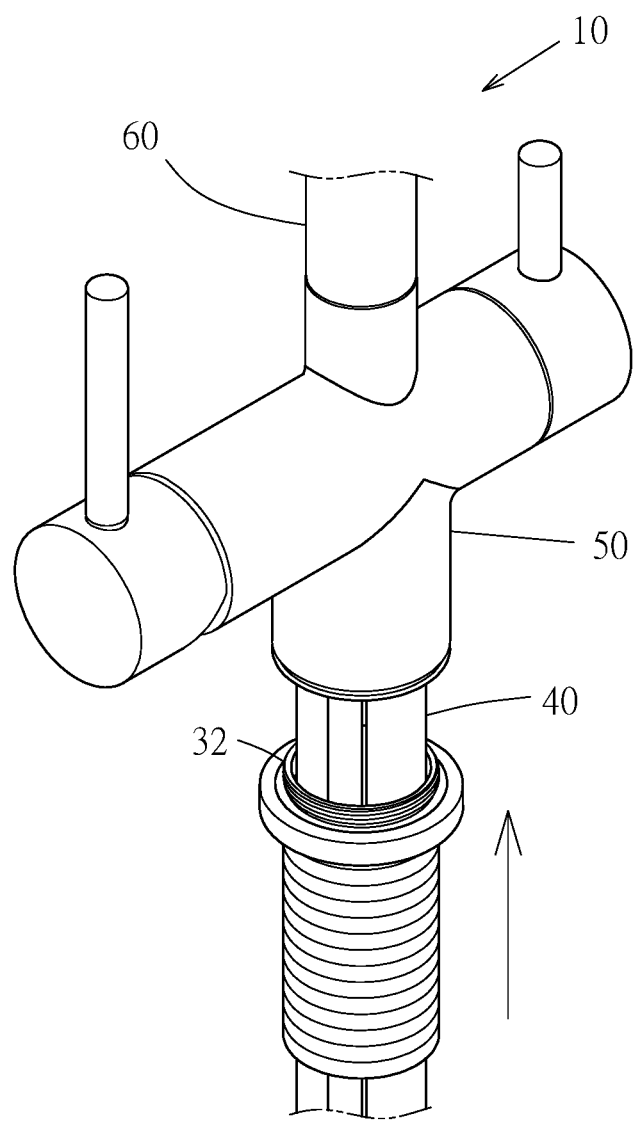
FIG. 11 is a perspective view (III) showing the assembly operation of a preferred embodiment of the invention.
Figure 12:
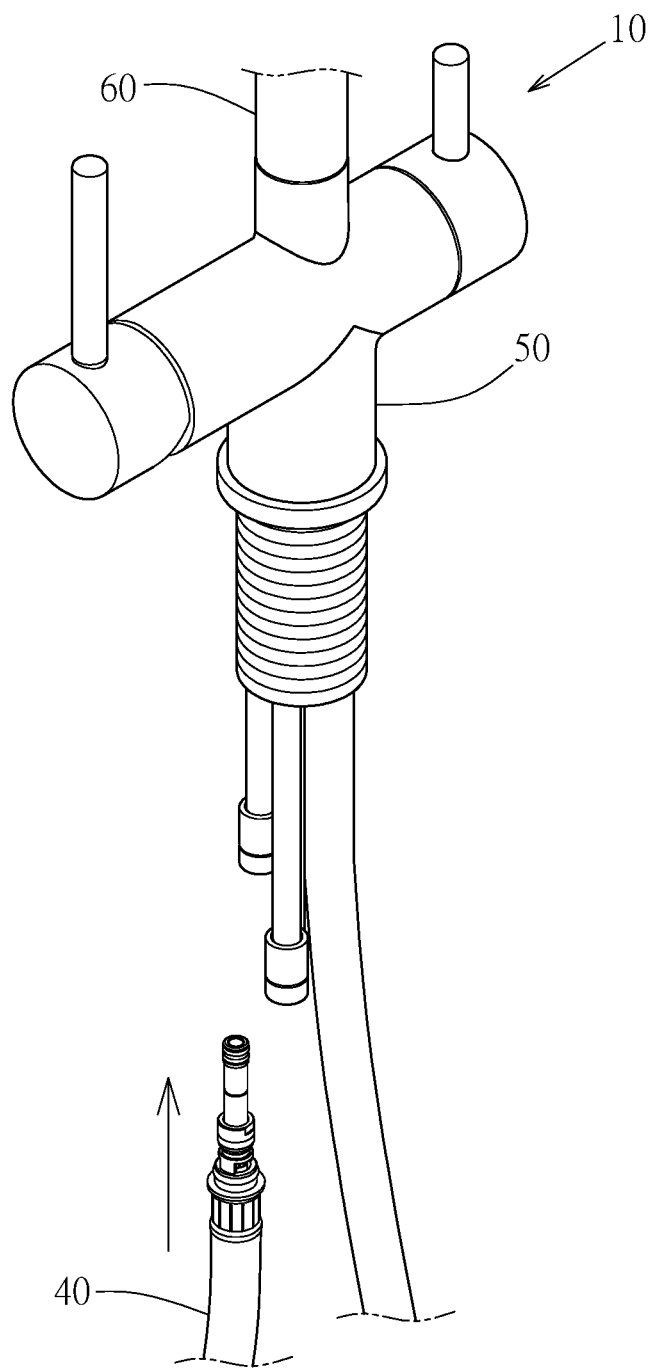
FIG. 12 is a perspective view (IV) showing the assembly operation of a preferred embodiment of the invention.

Below is a description of the operation of assembling the water pipe 40 to the main body 10. As shown in FIG. 9, the end of the water pipe 40 away from the water inlet structure 70 extends from above the socket 20 into the first passageway 21 till the water inlet structure 70 and enters into the first passageway 21. The convex part 22 is located below the convex ring 71, limiting the water inlet structure 70 in the axial direction. In this way, the water inlet structure 70 and the socket 20 are combined. Then, as shown in FIG. 10, the socket 20 configured on the water inlet structure 70 extends from below the base 50 and enters into the first chamber 53, and the water inlet structure 70 enters into the second chamber 54 and the third chamber 55, and the second passageway 23 is communicated to the connecting channel 56. Then, as shown in FIG. 11, the positioning member 30 is configured on the base 50. The positioning member 30 is used to limit the socket 20 in the axial direction. Then, as shown in FIG. 12, after the water guiding member 40 is bent, the other end of the water guiding member 40 away from the water inlet structure 70 goes into the base 50 from below, and passes through the second passageway 23 and the connecting channel 56 and goes into the extending pipe 60 to be connected to the water outlet 12. By now, the operation of assembling the water pipe 40 to the main body 10 is completed. During the process of extending the water guiding member 40 through the first passageway 21, the second passageway 23, the connecting channel 56 and the extending pipe 60, the protecting jacket 46 can prevent the outer pipe 42 from contacting and scratching the components of the socket 20, the base 50 and the extending pipe 60.

Through the water inlet structure 70, the socket 20 and the base 50, the preferred embodiment enables easy and quick assembly of the water pipe 40 and the main body 10.

The water inlet structure 70 is laterally formed with two first water inlets 72, the first flow channel 57 passes through each first water inlet 72 and is communicated to the outer pipe 42, so that water can pass through each first water inlet 72 and go into the outer pipe 42. The top end of the water inlet structure 70 is formed with a second water inlet 73 and is communicated to the inner pipe 44, so that water can go into the inner pipe 44. The number of the first water inlet 72 can be increased or reduced as needed. However, there must be at least one first water inlet 72.

The water inlet structure 70 blocks the communication between the second flow channel 58 and the second chamber 54. Specifically, the water inlet structure 70 has a seal ring 74. The seal ring 74 is tightly pressed against the side wall 552 of the third chamber 55, so as to block the communication between the second flow channel 58 and the second chamber 54. The water inlet structure 70 further includes a first water inlet pipe 75 and a second water inlet pipe 76. The first water inlet pipe 75 is axially connected to the outer pipe 42. The inside of the first water inlet pipe 75 is formed with a third flow channel 752. Specifically, one end of the first water inlet pipe 75 is axially inserted into and connected to the outer pipe 42. The third flow channel 752 is formed between the first water inlet pipe 75 and the inner pipe 44. The periphery of the first water inlet pipe is formed with each first water inlet 72. The third flow channel 752 is communicated to each first water inlet 72 and the outer pipe 42, so that water can pass through the third flow channel 752 and go into the outer pipe 42. The second water inlet pipe 76 is axially connected to the inner pipe 44. The top end of the second water inlet pipe 76 is formed with a second water inlet 73 communicated to the third chamber 55, so that water can pass through the second water inlet pipe 76 and go into the inner pipe 44.

The water inlet structure 70 further includes a liner tube 77. The liner tube 77 is configured between the first water inlet pipe 75 and the second water inlet pipe 76, so as to maintain the relative construction of the first water inlet pipe 75 and the second water inlet pipe 76. The liner tube 77 extends into the third chamber 55, and the liner tube 77 is communicated to the third chamber 55 and the second water inlet pipe 76. The seal ring 74 is optionally sheathed on the liner tube 77.

The liner tube 77 is in threaded connection with the second water inlet pipe 76. The periphery of the liner tube 77 is radially formed with a pressing part 772. The pressing part 772 presses the top end of the first water inlet pipe 75. The water inlet structure 70 further includes a locking member 78. The locking member 78 presses the top end of the pressing part 772, and the locking member 78 is in threaded connection with the first water inlet pipe 75, so as to lock the liner tube 77.

The positioning member 30 is a ring-shaped body, and the positioning member 30 goes into the first chamber 53 to push the socket 20, so as to position the socket 20. The water pipe 40 passes through the positioning member 30 and goes into the second passageway 23. The positioning member has a screw ring 32. The screw ring 32 is screwed into the first chamber 53, and the screw ring 32 pushes the socket 20.

We claim:

1. A fast assembling faucet component for dual water sources, comprising:

a main body, the main body includes a base and an extending pipe, wherein the top end of the base is connected to one end of the extending pipe, the other end of the extending pipe is separably connected to a water outlet, the two sides of the base are respectively formed with a first valve chamber and a second valve chamber, so that the first valve is configured in the first valve chamber, a second valve is configured in the second valve chamber, the inside of the base is formed with a first chamber, a second chamber, a third chamber and a connecting channel, the first chamber is extended to the bottom of the base and is communicated to the outside, the second chamber extends upward through the first chamber, the third chamber extends upward through the second chamber, the connecting channel is communicated to the first chamber and the extending pipe, a first flow channel is communicated to the first valve chamber and the second chamber, a second flow channel is communicated to the second valve chamber and the third chamber, so that the first valve can control water to pass through the first flow channel and go into the second chamber, the second valve controls water to pass through the second flow channel and go into the third chamber;

a socket is configured on the first chamber, the socket is formed with a first passageway and a second passageway along the axial direction, the first passageway and the second passageway are respectively extended to the top end and bottom end of the socket, the inner edge of the first passageway is formed with a convex part along the radial direction, the second passageway is communicated to the connecting channel, the socket crosses a first inlet channel and a second inlet channel, so that the water from the first water source can pass through the first inlet channel and go into the first valve chamber, and water from the second water source can pass through the second inlet channel and go into the second valve chamber;

a positioning member is connected to the base, so as to position the socket, and limit the axial displacement of the socket; and a water pipe passes through the second passageway and the connecting channel and goes into the extending pipe to be connected to the water outlet, the water pipe includes an outer pipe, an inner pipe and a water inlet structure, wherein the inner pipe is configured inside the outer pipe, the outer pipe and the inner pipe is respectively communicated to the water inlet structure, the water inlet structure is radially formed with a convex ring extending outward, the water inlet structure is axially configured on the first passageway, the convex part is located below the convex ring, so as to relatively limit the water inlet structure, thus, water from the first water source can pass through the second chamber, the water inlet structure, and go into the outer pipe, and water from the second water source can pass through the third chamber, the water inlet structure, and go into the inner pipe.

2. The fast assembling faucet component for dual water sources defined in claim 1, wherein the water inlet structure is laterally formed with at least one first water inlet, the first flow channel passes through each first water inlet and is communicated to the outer pipe, so that water can pass through the first water inlet and go into the outer pipe, the top end of the water inlet structure is formed with a second water inlet and is communicated to the inner pipe, so that water can go into the inner pipe.

3. The fast assembling faucet component for dual water sources defined in claim 2, wherein said water inlet structure blocks the communication between the second flow channel and the second chamber, the water inlet structure further includes a first water inlet pipe and a second water inlet pipe, the first water inlet pipe is axially connected to the outer pipe, the inside of the first water inlet pipe is formed with a third flow channel, the periphery of the first water inlet pipe is formed with a first water inlet, the third flow channel is communicated to each first water inlet and the outer pipe, so that water can pass through the third flow channel and go into the outer pipe, the second water inlet pipe is axially connected to the inner pipe, the top end of the second water inlet pipe is formed with a second water inlet and is communicated to the third chamber, so that water can pass through the second water inlet pipe and go into the inner pipe.

4. The fast assembling faucet component for dual water sources defined in claim 3, wherein one end of the first water inlet pipe is axially inserted into the outer pipe, and a third flow channel is formed between the first water inlet pipe and the inner pipe.

5. The fast assembling faucet component for dual water sources defined in claim 3, wherein said water inlet structure further includes a liner tube, the liner tube is configured between the first water inlet pipe and second water inlet pipe, so as to maintain the relative structure of the first water inlet pipe and the second water inlet pipe.

6. The fast assembling faucet component for dual water sources defined in claim 4, wherein said water inlet structure further includes a liner tube, the liner tube is configured between the first water inlet pipe and second water inlet pipe, so as to maintain the relative structure of the first water inlet pipe and the second water inlet pipe.

7. The fast assembling faucet component for dual water sources defined in claim 5, wherein said liner tube extends into the third chamber, and the liner tube is communicated to the third chamber and the second water inlet pipe.

8. The fast assembling faucet component for dual water sources defined in claim 6, wherein said liner tube extends into the third chamber, and the liner tube is communicated to the third chamber and the second water inlet pipe.

9. The fast assembling faucet component for dual water sources defined in claim 5, wherein said liner tube is in threaded connection with the second water inlet pipe, the periphery of the liner tube is radially formed with a pressing part, the pressing part presses the top end of the first water inlet pipe, the water inlet structure further includes a locking member, the locking member presses the top end of the pressing part, and the locking member is in threaded connection with the first water inlet pipe, so as to lock the liner tube.

10. The fast assembling faucet component for dual water sources defined in claim 6, wherein said liner tube is in threaded connection with the second water inlet pipe, the periphery of the liner tube is radially formed with a pressing part, the pressing part presses the top end of the first water inlet pipe, the water inlet structure further includes a locking member, the locking member presses the top end of the pressing part, and the locking member is in threaded connection with the first water inlet pipe, so as to lock the liner tube.

11. The fast assembling faucet component for dual water sources defined in claim 1, wherein said positioning member is a ring-shaped body, and the positioning member and go into the first chamber to push the socket, so as to position the socket, the water pipe passes through the positioning member and enters into the passageway.

* * * * *